(12) United States Patent
Maeta et al.

(10) Patent No.: US 9,333,567 B2
(45) Date of Patent: May 10, 2016

(54) INDEXABLE CUTTING INSERT FOR MILLING

(71) Applicant: SUMITOMO ELECTRIC HARDMETAL CORP., Hyogo (JP)

(72) Inventors: Atsuhiko Maeta, Itami (JP); Kouki Matsubara, Itami (JP); Katsuya Nakakihara, Itami (JP); Yoshinari Nagami, Itami (JP)

(73) Assignee: SUMITOMO ELECTRIC HARDMETAL CORP., Hyogo (JP)

( * ) Notice: Subject to any disclaimer, the term of this patent is extended or adjusted under 35 U.S.C. 154(b) by 183 days.

(21) Appl. No.: 14/240,299

(22) PCT Filed: Sep. 10, 2013

(86) PCT No.: PCT/JP2013/074363
§ 371 (c)(1),
(2) Date: Feb. 21, 2014

(87) PCT Pub. No.: WO2014/007407
PCT Pub. Date: Jan. 9, 2014

(65) Prior Publication Data
US 2014/0193216 A1 Jul. 10, 2014

(30) Foreign Application Priority Data
Oct. 23, 2012 (JP) .................... 2012-233597

(51) Int. Cl.
*B23B 5/00* (2006.01)
*B23C 5/20* (2006.01)
(Continued)

(52) U.S. Cl.
CPC ............. *B23C 5/207* (2013.01); *B23B 27/1611* (2013.01); *B23C 2200/0455* (2013.01);
(Continued)

(58) Field of Classification Search
CPC ............... B23B 2200/0404; B23B 2200/0409; B23B 2200/0414; B23B 2200/0438; B23B 2200/0442; B23B 2200/0476
See application file for complete search history.

(56) References Cited

U.S. PATENT DOCUMENTS 5,190,418 A * 3/1993 Nakayama ............... B23C 5/207
407/113
6,050,752 A * 4/2000 DeRoche ................ B23C 5/202
407/114

(Continued)

FOREIGN PATENT DOCUMENTS

CN 1382078 A 11/2002
CN 1445038 A 10/2003

(Continued)

OTHER PUBLICATIONS

European Office Action for related European Patent Application No. 13813925.8-1709 dated Sep. 10, 2015, 4 pages.

(Continued)

*Primary Examiner* — Will Fridie, Jr.
(74) *Attorney, Agent, or Firm* — Ditthavong & Steiner, P.C.

(57) ABSTRACT

An object is to provide a cutting insert for milling that has a minor cutting edge for wiping to achieve improved machined surface quality. A minor cutting edge 3 at a corner includes two circular cutting edge portions 3a and 3a joined to major cutting edges 2 on both sides of the corner and a straight cutting edge portion 3b located between the two circular cutting edge portions 3a. The cutting insert satisfies the following conditions: $0.05TA \leq L1 \leq 0.4TA$, $0.1L1 \leq L \leq 0.5L1$, and $h \leq 15\ \mu m$, where TA is the radius of a circle inscribed inside the major cutting edges 2 as viewed in the thickness direction of the cutting insert, L1 is the length of the minor cutting edge 3 in the longitudinal direction of the straight cutting edge portion 3b, L is the length of the straight cutting edge portion 3b, and h is the height of the minor cutting edge 3.

2 Claims, 3 Drawing Sheets

(51) Int. Cl.
*B23B 27/16* (2006.01)
*B23B 5/02* (2006.01)

(52) U.S. Cl.
CPC ..... *B23C2200/201* (2013.01); *B23C 2200/203* (2013.01); *B23C 2200/208* (2013.01); *Y10T 407/23* (2015.01)

(56) References Cited

U.S. PATENT DOCUMENTS

| | | | |
|---|---|---|---|
| 6,543,970 B1* | 4/2003 | Qvarth | B23C 5/202 407/114 |
| 7,410,332 B2* | 8/2008 | Scherbarth | B23C 5/202 407/113 |
| 7,544,023 B2* | 6/2009 | Lof | B23B 27/141 407/113 |
| 8,523,498 B2* | 9/2013 | Uno | B23C 5/06 407/113 |

FOREIGN PATENT DOCUMENTS

| | | |
|---|---|---|
| CN | 1662335 A | 8/2005 |
| CN | 101213045 A | 7/2008 |
| CN | 101460276 A | 6/2009 |
| EP | 1886749 A1 | 2/2008 |
| EP | 2444188 A1 | 4/2012 |
| EP | 2489454 A1 | 8/2012 |
| JP | 60-172619 U | 11/1985 |
| JP | 7-037515 U | 7/1995 |
| JP | 2009-274207 A | 11/2009 |
| JP | 2011-110634 A | 6/2011 |
| WO | 2006137050 A1 | 12/2006 |
| WO | 2010127743 A1 | 11/2010 |
| WO | 2010/147157 A1 | 12/2010 |

OTHER PUBLICATIONS

International Search Report for corresponding International Application PCT/JP2013/074363, Oct. 8, 2013, 2 pages.
Chinese Office Action for related Chinese Patent Application No. 201380002767.1 dated Apr. 27, 2015, 12 pages.

* cited by examiner

INDEXABLE CUTTING INSERT FOR MILLING

TECHNICAL FIELD

The present invention relates to indexable cutting inserts for milling (hereinafter simply referred to as cutting inserts), and specifically to a cutting insert having a minor cutting edge used as a wiper edge at a corner thereof.

BACKGROUND ART

An example of an indexable cutting insert for milling, mentioned at the beginning, is disclosed in PTL 1 below.

The cutting insert in PTL 1 is generally polygonal, e.g., square, and has a straight minor cutting edge (minor edge) formed at each corner of the polygon so as to extend in a direction perpendicular to the bisector of the corner in plan view.

In other cases, instead of the straight minor cutting edge, a circular minor cutting edge having a large radius of curvature and approximating to a straight line is provided at each corner of the polygon.

CITATION LIST

Patent Literature

PTL 1: Japanese Unexamined Patent Application Publication No. 2009-274207

SUMMARY OF INVENTION

Technical Problem

Minor cutting edges that are straight in plan view are disadvantageous in that they form a rough machined surface if the mounting orientation of the cutting insert relative to the cutter body varies (tilted from the normal mounting orientation). A typical milling cutter is equipped with a plurality of cutting inserts, and it is nearly impossible to align the orientation (make equal the face angle) of each cutting insert.

If the mounting orientation of each cutting insert varies, as shown in FIG. 7, finishing with straight minor cutting edges 13 leaves behind more of the portion of a workpiece W to be removed and thus forms a rough machined surface. In addition, if the tilt of each cutting insert varies, the machined surface shows irregular feed marks, which make it difficult to improve the quality of the machined surface.

In contrast, finishing with circular minor cutting edges is less susceptible to the influence of the tilt of cutting inserts than finishing with straight minor cutting edges. However, as shown in FIG. 8, even if the tilt of cutting inserts with respect to the normal orientation is close to 0°, the height h1 of an edge-to-edge ridge remaining on a machined surface finished with circular minor cutting edges 23 is larger than the height of a ridge remaining on a machined surface finished with straight minor cutting edges; thus, the circular minor cutting edges 23 leave behind more of the portion to be removed than straight minor cutting edges.

It is also difficult to align the positions of circular cutting edges of a plurality of cutting inserts because the reference position for edge runout measurement varies. This results in increased surface roughness after machining using cutting inserts having circular minor cutting edges and thus makes it difficult to improve the machining quality.

An object of the present invention is to provide a cutting insert for milling that has a minor cutting edge for wiping to achieve improved machined surface quality.

Solution to Problem

To solve the above problems, a generally polygonal indexable cutting insert for milling according to the present invention has a minor cutting edge for finishing at a corner thereof. The minor cutting edge includes two circular cutting edge portions joined to straight major cutting edges on both sides of the corner and a straight cutting edge portion located between the two circular cutting edge portions. The indexable cutting insert for milling is configured as follows.

Specifically, the indexable cutting insert for milling satisfies the following conditions:

$$0.05 TA \leq L1 \leq 0.4 TA,\ 0.1 L1 \leq L \leq 0.5 L1,\ \text{and}\ h \leq 15\ \mu m$$

where TA is the radius of a circle inscribed inside the major cutting edges as viewed in the thickness direction of the indexable cutting insert for milling, L1 is the length of the minor cutting edge in the longitudinal direction of the straight cutting edge portion, L is the length of the straight cutting edge portion, and h is the height of the minor cutting edge.

The height h of the minor cutting edge is the distance between the straight cutting edge portion and a line parallel to the straight cutting edge portion and passing through the endpoints of the minor cutting edge in the bisector direction of the corner. If the distance differs at the left and right endpoints of the minor cutting edge, the height h is the larger distance.

In one preferred embodiment, the straight cutting edge portion is tangent to the arcs of the two circular cutting edge portions as viewed in the thickness direction of the indexable cutting insert for milling.

Advantageous Effects of Invention

Because the minor cutting edge of the cutting insert according to the present invention includes the straight cutting edge portion located between the two circular cutting edge portions, the height of a ridge remaining on a machined surface finished with the minor cutting edge is lower than the height of a ridge remaining on a surface finished with a minor cutting edge that is circular in its entirety. Thus, the cutting insert according to the present invention leaves behind less of the portion to be cut on the machined surface and thus provides a lower surface roughness.

Because both sides of the minor cutting edge are circular cutting edges, even if the mounting orientation of the cutting insert is tilted, the minor cutting edge is less susceptible to the influence of the tilt (variations in machining allowance and variations in the path profile of the minor cutting edge) and thus forms less irregular feed marks.

Because the straight cutting edge portion of the minor cutting edge is located in the center of the corner, the straight cutting edge portion can be used as a reference for edge runout measurement. Edge runout measurement using the straight cutting edge portion as a reference allows the edge positions of a plurality of cutting inserts to be precisely aligned. This produces a synergistic effect to improve the machined surface quality compared to a surface machined using cutting inserts in the related art.

DESCRIPTION OF EMBODIMENTS

Figure 1:
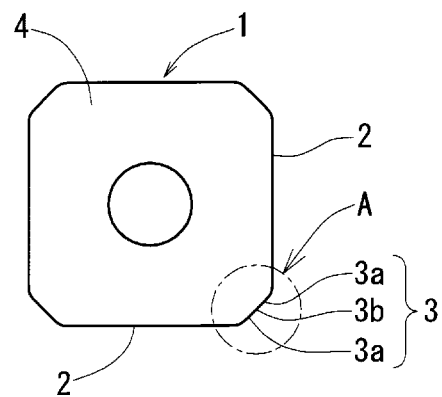
FIG. 1 is a plan view showing an example of a cutting insert according to the present invention.
Figure 2:
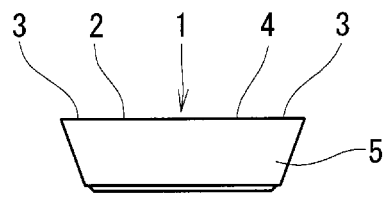
FIG. 2 is a side view of the cutting insert in FIG. 1.

Embodiments of cutting inserts for milling according to the present invention will now be described with reference to FIGS. 1 to 5 of the attached drawings.

An exemplary cutting insert 1 is a generally square positive insert for face milling cutters with a lead angle of 45°. Major cutting edges are indicated at 2, and minor cutting edges formed at the corners are indicated at 3.

The major cutting edges 2 are formed by ridges at positions where a top face 4 forming a rake face meets side faces 5 that meet the top face 4 at an acute angle.

The minor cutting edges 3 are formed at the corners of the general shape of the insert. The minor cutting edges 3 are composed of two circular cutting edge portions 3a and 3a and one straight cutting edge portion 3b.

Figure 3:
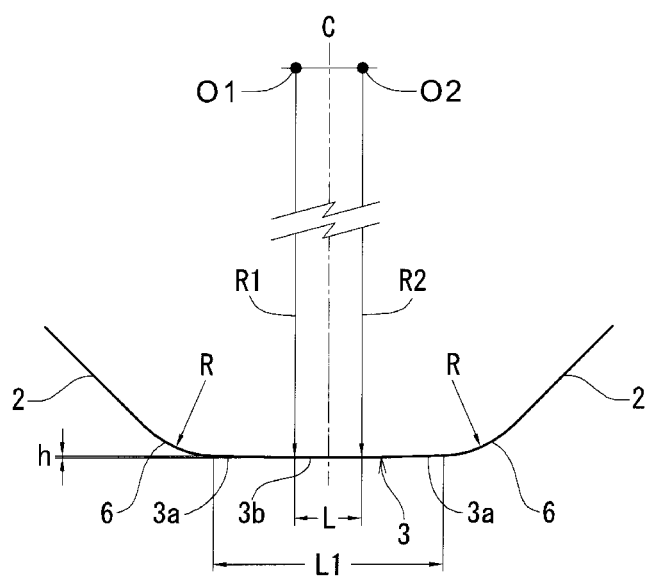
FIG. 3 is an enlarged plan view of part A in FIG. 1.

The two circular cutting edge portions 3a and 3a have equal radii of curvature R1 and R2, and their respective arc centers O1 and O2 lie on lines perpendicular to the straight cutting edge portion 3b in the plan view in FIG. 3 as viewed in the thickness direction of the cutting insert 1. These circular cutting edge portions 3a and 3a are joined to the major cutting edges 2 on both sides of the corner, with joining portions 6 having a smaller arc radius therebetween.

The left and right circular cutting edge portions 3a and 3a may have different radii of curvature R1 and R2.

The straight cutting edge portion 3b is located between the two circular cutting edge portions 3a and 3a. This straight cutting edge portion 3b is perpendicular to a bisector C of the corner and is joined at both ends to the left and right circular cutting edge portions 3a and 3a.

If the left and right circular cutting edge portions 3a and 3a have different radii of curvature R1 and R2, the center of the straight cutting edge portion 3b in the longitudinal direction deviates from the bisector C of the corner (the straight cutting edge portion 3b has different lengths on both sides of the bisector C of the corner). In this case, the amount of deviation of the center of the straight cutting edge portion 3b is set such that the center lies at a position that is 40% to 60% of the end-to-end length L1 of the minor cutting edge 3 (the entire length of the minor cutting edge 3 in the longitudinal direction of the straight cutting edge portion 3b) apart from one end of the minor cutting edge 3.

For the cutting insert 1 in FIG. 1, the straight cutting edge portion 3b is tangent to the arcs of the two circular cutting edge portions 3a and 3a in the plan views in FIGS. 1 and 3 (as viewed in the thickness direction of the cutting insert 1), and there is no edge between the straight cutting edge portion 3b and the circular cutting edge portions 3a and 3a.

The circular cutting edge portions 3a are also joined to the joining portions 6 having a smaller arc radius such that no edge is formed therebetween, and similarly, the joining portions 6 are joined to the major cutting edges 2 such that no edge is formed therebetween (such that the major cutting 2 edges are defined by the tangents to the joining portions 6).

It is preferred that the straight cutting edge portion 3b be tangent to the arcs of the two circular cutting edge portions 3a and 3a (no edge be formed therebetween) in terms of cutting edge protection and machining precision. However, as shown in FIGS. 4 and 5, the straight cutting edge portion 3b may be joined to the circular cutting edge portions 3a such that edges are formed therebetween.

Figure 4:
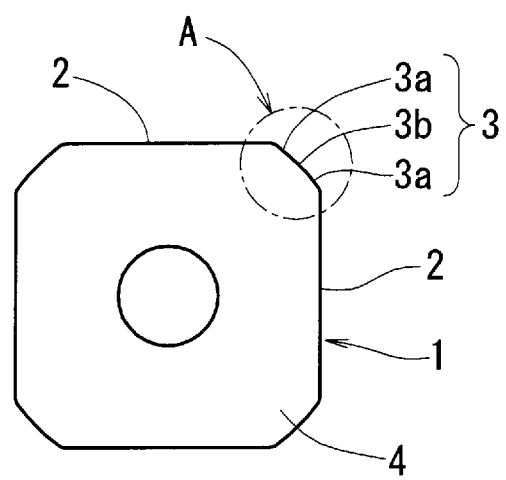
FIG. 4 is a plan view showing another example of a cutting insert according to the present invention.
Figure 5:
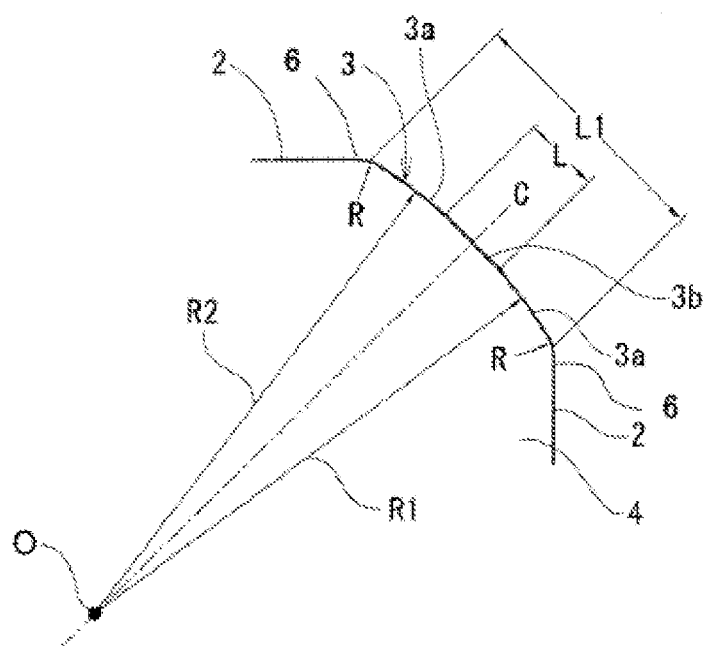
FIG. 5 is an enlarged plan view of part A in FIG. 4.

For the cutting insert 1 in FIGS. 4 and 5, the two circular cutting edge portions 3a and 3a have equal radii of curvature R1 and R2, and the arc center O of each circular cutting edge portion 3a lies on the bisector C of the corner shown in FIG. 5. These circular cutting edge portions 3a and 3a are joined to the straight major cutting edges 2 on both sides of the corner, with the joining portions 6 having a smaller arc radius therebetween. The major cutting edges 2 are defined by the tangents to the joining portions 6, as in the embodiment described above.

Figure 6:
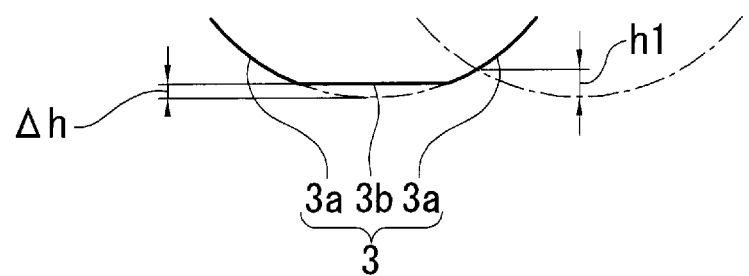
FIG. 6 is an illustration comparing the height of a ridge remaining on a machined surface after cutting with minor cutting edges of the cutting insert according to the present invention with the height of a ridge remaining after cutting with minor cutting edges that are circular in their entirety.
Figure 7:
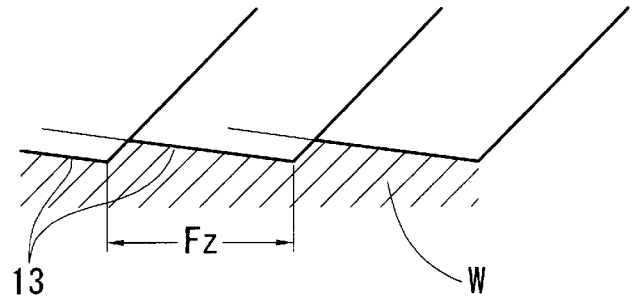
FIG. 7 is an illustration showing, in an exaggerated view, the profile of a surface machined with a tilted cutting insert having straight minor cutting edges.
Figure 8:
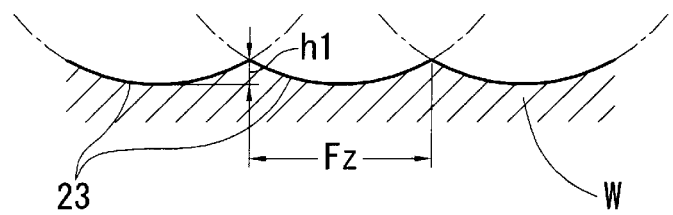
FIG. 8 is an illustration showing, in an exaggerated view, the profile of a surface machined with a tilted cutting insert having minor cutting edges that are circular in their entirety.

As shown in FIG. 6, the straight cutting edge portion 3b is provided such that the cutting insert according to the present invention is cut between the left and right circular cutting edge portions 3a and 3a (indicated by the imaginary line). Thus, the height of a ridge remaining on a machined surface is lower than the height of a ridge remaining after cutting with minor cutting edges that are circular in their entirety.

Specifically, whereas the height of a ridge remaining on a machined surface after cutting with minor cutting edges that are circular in their entirety is h1 in FIG. 6, the height of a ridge remaining after cutting with the minor cutting edges 3 of the cutting insert according to the present invention is (h1-Δh). Thus, the cutting insert according to the present invention leaves behind less of the portion to be cut than cutting inserts in the related art having minor cutting edges that are circular in their entirety.

The radii of curvature R1 and R2 of the circular cutting edge portions 3a and 3a are set to about 20 to 200 mm.

The length L1 of the minor cutting edges 3 (the end-to-end length of the minor cutting edges 3 in the longitudinal direction of the straight cutting edge portion 3b) and the length L of the straight cutting edge portion 3b are set so as to satisfy the following conditions: $0.05TA \leq L1 \leq 0.4TA$, $0.1L1 \leq L \leq 0.5L1$, and $h \leq 15$ μm, where TA is the radius of a circle inscribed inside the major cutting edges 2, and h is the height of the minor cutting edges 3.

If the end-to-end length L1 of the minor cutting edges 3 is 0.05TA or more, they can effectively improve the machined surface quality compared to minor cutting edges (wiper edges) that are circular in their entirety. If the length L1 is 0.4TA or less, the major cutting edges 2 have a sufficient length.

If the length L of the straight cutting edge portion 3b is 0.1 time or more L1, the minor cutting edges 3 can effectively improve the machined surface quality compared to minor cutting edges that are circular in their entirety. If the length L is 0.5 time or less L1, the circular portions can effectively correct the tilt of the cutting insert 1.

If the height h of the minor cutting edges 3 is 15 μm or less, the surface flatness of a machined surface finished by cutting with the circular cutting edge portions 3a can be sufficiently increased.

If the length L1 of the minor cutting edges 3, the length L of the straight cutting edge portion 3b, and the height h of the minor cutting edges 3 are set as described above, the circular cutting edge portions 3a have a larger radius of curvature than circular cutting edges in the related art. This results in reduced machined surface roughness irrespective of a slight tilt of the cutting insert 1.

Although the length L1 of the minor cutting edges 3 of the illustrated cutting insert 1 is 2 mm, the length L of the straight cutting edge portion 3b is 0.6 mm, and the radii of curvature R1 and R2 of the circular cutting edge portions 3a and 3a are 40 mm, the dimensional specifications of the minor cutting edges 3 are not limited to those illustrated herein.

The minor cutting edges 3 are not necessarily straight in a side view. For example, the straight cutting edge portion 3b may be convex in a side view, and the circular cutting edge portions 3a on both sides thereof may be straight or convex with a larger arc radius than the straight cutting edge portion 3b in a side view.

Although the illustrated cutting insert 1 is generally square, the present invention may also be applied to cutting inserts having general shapes such as equilateral triangles, rhombuses, and rectangles.

EXAMPLES

The properties of surfaces machined by cutting at feed rates Fz per edge of 0.2 mm, 0.5 mm, and 1.0 mm using a cutting insert (invention product) having the shape shown in FIGS. 1 and 3, a cutting insert having straight minor cutting edges with a length of 2 mm, and cutting inserts having minor cutting edges with radii of curvature R of 40 mm and 80 mm (end-to-end length=2 mm) were compared. The invention product had minor cutting edges with the following dimensional specifications: the radius TA of the inscribed circle was 13.34 mm, the length L1 of the minor cutting edges 3 was 2 mm, the length L of the straight cutting edge portion 3b was 0.6 mm, the radii of curvature R1 and R2 of the circular cutting edge portions 3a and 3a were 40 mm, and the height h was 6.5 μm.

The heights (surface roughnesses) of ridges remaining on the machined surfaces when the variation (tilt) of the mounting orientation of the cutting inserts was 0°, 5', or 10' were examined. The results are listed in Table I. The values in the table are expressed as ten-point average roughnesses Rz (μm).

TABLE I

| MINOR CUTTING EDGE | Fz = 0.2 | | | Fz = 0.5 | | | Fz = 1.0 | | |
|---|---|---|---|---|---|---|---|---|---|
| | Tilt 0° | 5' | 10' | Tilt 0° | 5' | 10' | Tilt 0° | 5' | 10' |
| Straight | 0 | 0.25 | 0.44 | 0 | 0.64 | 1.27 | 0 | 1.27 | 2.54 |
| Circular R40 | 0.13 | 0.13 | 0.13 | 0.78 | 0.78 | 0.78 | 3.13 | 3.13 | 3.13 |
| Circular R80 | 0.06 | 0.06 | 0.06 | 0.39 | 0.39 | 0.39 | 1.56 | 1.56 | 1.56 |
| Invention Product | 0 | 0.11 | 0.13 | 0 | 0.42 | 0.62 | 0.5 | 1.01 | 1.67 |

The comparison data in Table I shows that the cutting insert having straight minor cutting edges was superior to the invention product in terms of surface roughness Rz when the tilt was 0° and the feed rate Fz per edge was high. The data also shows that the cutting insert having circular minor cutting edges of R80 was superior to the invention product in terms of surface roughness Rz when the feed rate Fz per edge was 0.2 mm or 0.5 mm, and when the feed rate Fz per edge was 1.0 mm and the tilt of the cutting inserts was 10'. The invention product, however, was superior to the products in the related art in terms of surface roughness under other conditions, demonstrating that the cutting insert of the present invention contributes to improved machined surface quality.

Although embodiments of the present invention have been described above, the disclosed embodiments are merely illustrative and do not limit the scope of the present invention. Rather, the scope of the present invention is defined by the claims and further encompasses all modifications within the meaning and range of equivalency of the claims.

REFERENCE SIGNS LIST

1 cutting insert
2 major cutting edge
3, 13, 23 minor cutting edge
3a circular cutting edge portion
3b straight cutting edge portion
4 top face
5 side face
6 joining portion
C bisector of corner
O, O1, O2 arc center of circular cutting edge portion
L1 length of minor cutting edge (straight-line distance between ends of minor cutting edge)
L length of straight cutting edge portion
W workpiece
h height of minor cutting edge

The invention claimed is:

1. A polygonal indexable cutting insert for milling comprising:
   a minor cutting edge for finishing at a corner thereof, the minor cutting edge comprising:
      two circular cutting edge portions joined to straight major cutting edges on both sides of the corner; and
      a straight cutting edge portion located between the two circular cutting edge portions,
   wherein the indexable cutting insert satisfies the following conditions:

0.05TA≤L1≤0.4TA, 0.1L1≤L≤0.5L1, and h≤15 μm where TA is the radius of a circle inscribed inside the major cutting edges as viewed in the thickness direction of the indexable cutting insert for milling, L1 is the length of the minor cutting edge in the longitudinal direction of the straight cutting edge portion, L is the length of the straight cutting edge portion, and h is the height of the minor cutting edge,
   joining portions connect the circular cutting edge portions to the major cutting edges, and
   a radius of curvature R of the circular cutting edge portions is 20 to 200 mm.

2. The indexable cutting insert for milling according to claim 1, wherein the straight cutting edge portion is tangent to the arcs of the two circular cutting edge portions as viewed in the thickness direction of the indexable cutting insert for milling.

* * * * *